Patented June 20, 1933

1,914,519

UNITED STATES PATENT OFFICE

WILLIAM C. MARTIN, OF WASHINGTON, DISTRICT OF COLUMBIA, ASSIGNOR TO THE GOVERNMENT OF THE UNITED STATES

FORMULA FOR DENATURING ALCOHOL

No Drawing.     Application filed August 1, 1931. Serial No. 554,593.

(GRANTED UNDER THE ACT OF MARCH 3, 1883, AS AMENDED APRIL 30, 1928; 370 O. G. 757)

The invention described herein may be manufactured and used by or for the Government of the United States for governmental purposes only without the payment of any royalty thereon.

My invention relates to the denaturation of alcohol for industrial purposes, and particularly to a formula which will not be injurious for use in the arts and industries, and thus work no harm to the public when used for such legal purposes, but which will render the alcohol unfit for internal use in its commercial form and also assists in preventing the complete removal of other denaturants by illegal processes.

This invention relates to the use of tertiary terpene alcohols in their alpha, beta and gamma isomers, or combinations thereof as denaturants, particularly for ethyl alcohol.

I have discovered that commercial alpha, beta or gamma terpineol or any combination thereof in combination with impure or "crude" isopropanol, hydrocarbons or other denaturing ingredients in ethyl alcohol imparts to the alcohol a disagreeable taste and when used with aldehol or alcotate partially masks the disagreeable odor, while it renders the separation of pure ethyl alcohol from that combination a very difficult matter and tends to prevent the use of such illegally separated alcohol for beverage purposes. Aldehol grade A is a product of the oxidation of kerosene and may have the following characteristics (U. S. Treasury Department; Bureau of Prohibition: Appendix to Regulations No. 3 (formerly 61), Formulæ for Completely and Specially Denatured Alcohol, revised June, 1930, page 4).

*Specific gravity.*—Not over 0.825 at 60 degrees Fahrenheit.

*Distillation range.*—When 100 cubic centimeters are subjected to distillation in the same manner and apparatus specified for determining the boiling point of methane not less than 20 cubic centimeters will distill over under 200 degrees centigrade and not less than 95 cubic centimeters will distill over under 290 degrees centigrade.

*The aldehyde test.*—Alcohol solubility and iodine number shall be made at temperatures between 60 degrees and 80 degrees Fahrenheit.

Behavior with Schiff's reagent (aldehydes)-Ten cubic centimeters of the liquid with 15 cubic centimeters of Schiff's reagent made according to the directions in U. S. P. must show decided violet color within 30 seconds after addition and agitation.

*Solubility in 90 per cent ethyl alcohol by volume.*—When 10 cubic centimeters of the liquid is placed in a stoppered cylinder, graduated to one-tenth of a cubic centimeter an equal quantity of 90 per cent ethyl alcohol added, and the contents shaken and allowed to stand, the alcohol layer will measure not less than 12 cubic centimeters.

*Iodine number.*—The iodine number shall be not less than 35.

Alcotate is a petroleum product free from water and all suspended materials and may have the following characteristics (Circular Letter No. 35, dated December 27, 1930 from J. M. Doran, Commissioner of Prohibition).

*Specific gravity.*—Not less than 0.850 at 60 degrees Fahrenheit.

*Sulphur.*—The sulphur content shall not be less than 4½ per cent as determined by the "Bomb" method. It shall contain no hydrogen sulfide, carbon disulfide or added elementary sulphur. The percentage of sulphur in the fraction distilling between the 20 per cent and the 70 per cent A. S. T. M. fractional distillation points shall not be less than 80 per cent of the percentage of sulphur in the original sample.

*Distillation range (A. S. T. M. (Method D-86)).*—When 20 per cent has been recovered in the receiver the thermometer shall not read higher than 347 degrees Fahrenheit (175 degrees centigrade). When 50 per cent has been recovered in the receiver the thermometer shall not read higher than 383 degrees Fahrenheit (195 degrees centigrade). When 90 per cent has been recovered in the receiver the thermometer shall not read higher than 473 degrees Fahrenheit (245 degrees centigrade).

*Solubility in 95 per cent ethyl alcohol.*—When mixed at 25 degrees centigrade with an equal volume of 95 per cent ethyl alcohol, there shall be no separation.

*Turbidity test.*—When 25 cubic centimeters of a 1½ per cent solution of alcotate in 95 per cent ethyl alcohol is titrated with distilled water, the solutions being held at a temperature of 77 degrees Fahrenheit, at least 8 cubic centimeters of water shall be required to produce turbidity equal to that of a standard, freshly prepared by dissolving 1½ grams of chemically pure lead acetate in 100 cubic centimeters of water at 77 degrees Fahrenheit. This material cannot be removed from denatured alcohol by treatment with acids, alkalis, mineral oils, activated carbon, or by dilution with water.

What I claim is—

1. A composition of matter comprising combination of alpha terpineol with impure isopropanol as a denaturant for alcohol.

2. A composition of matter comprising combination of two or more terpineols with impure isopropanol as a denaturant for alcohol.

3. A composition of matter comprising an alcohol, alpha terpineol, denaturing isopropanol and aldehol.

4. A composition of matter comprising an alcohol, alpha terpineol and denaturing isopropanol.

5. A composition of matter comprising ethyl alcohol, denaturing alpha terpineol and denaturing isopropanol.

6. A method of denaturing alcohol which comprises combining therewith alpha terpineol and denaturing isopropanol.

7. A method of denaturing alcohol which comprises combining therewith commercial alpha terpineol and aldehol.

8. A composition of matter comprising an alcohol, alpha terpineol and aldehol.

In testimony whereof I affix my signature.

WILLIAM C. MARTIN.